(12) United States Patent
Pankajakshan et al.

(10) Patent No.: US 9,148,453 B1
(45) Date of Patent: Sep. 29, 2015

(54) DYNAMIC DETERMINATION OF INITIAL FILTER CRITERIA

(75) Inventors: Bejoy Pankajakshan, Olathe, KS (US); Charles Brent Hirschman, Overland Park, KS (US); Jeremy R. Breau, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1234 days.

(21) Appl. No.: 13/047,118

(22) Filed: Mar. 14, 2011

(51) Int. Cl.
  *H04L 29/06* (2006.01)
  *H04L 29/08* (2006.01)
  *H04W 24/00* (2009.01)

(52) U.S. Cl.
  CPC .............. *H04L 65/105* (2013.01); *H04L 67/16* (2013.01)

(58) Field of Classification Search
  USPC ........................................ 709/228
  See application file for complete search history.

(56) References Cited

U.S. PATENT DOCUMENTS

| 8,601,058 | B2* | 12/2013 | Ahmad et al. ................ 709/204 |
| 2005/0190772 | A1 | 9/2005 | Tsai et al. |
| 2005/0213606 | A1 | 9/2005 | Huang et al. |
| 2007/0088836 | A1 | 4/2007 | Tai et al. |
| 2007/0183395 | A1 | 8/2007 | Balyan et al. |
| 2009/0262920 | A1* | 10/2009 | Henrikson et al. ....... 379/221.09 |
| 2011/0261835 | A1* | 10/2011 | Dhesikan et al. ............ 370/468 |
| 2011/0276818 | A1* | 11/2011 | Yamamoto et al. .......... 713/340 |
| 2012/0020252 | A1* | 1/2012 | Bouthemy .................... 370/259 |

* cited by examiner

*Primary Examiner* — Angela Nguyen

(57) ABSTRACT

An IP multimedia subsystem comprises a CSCF and an HSS. The CSCF is configured to receive a SIP registration message transferred by a user communication device and responsively transfer a registration request to the HSS. The HSS is configured to process the registration request to obtain IFC for the user communication device, wherein the IFC comprises processing instructions that direct the CSCF to perform an operation to dynamically obtain and load data into the IFC. The CSCF is configured to receive a SIP invite message transferred by the user communication device, process text from the SIP invite message against a set of keywords to determine a dynamic parameter based on a keyword match, process one of the processing instructions in the IFC to obtain and load the dynamic parameter into the IFC, process the IFC with the dynamic parameter to determine a communication session parameter, and transfer a SIP message with the communication session parameter responsive to the SIP invite message.

20 Claims, 6 Drawing Sheets

DYNAMIC DETERMINATION OF INITIAL FILTER CRITERIA

TECHNICAL BACKGROUND

Individuals may utilize communication networks for voice communications, research, entertainment, or for conducting critical business transactions. Users of communication networks also frequently request multimedia content via the networks in real-time, often referred to as streaming media. An internet protocol multimedia subsystem (IMS) is a network architectural framework that supports these streaming media sessions and other types of communication services.

IMS is designed to enable delivery of real-time multimedia services in the internet protocol (IP) to communication devices operated by users requesting these services. IMS typically utilizes the session initiation protocol (SIP) to facilitate communication session setup and tear-down. IMS assists in providing access to multimedia and voice applications for both wireless and wireline communication devices, which is commonly referred to as fixed-mobile convergence. Essentially, IMS operates as a horizontal control layer that isolates an access network from the service layer that provides the content or services requested by the users. Therefore, an IMS core network architecture provides access aggregation for several different access networks, and can be utilized to provide communication services from the service layer independent of the underlying access technology employed by a user or network. In order to invoke a communication service for an IMS user, initial filter criteria (IFC) is processed to determine when a particular application server should be contacted to provide the communication service.

OVERVIEW

A method of operating an internet protocol (IP) multimedia subsystem is disclosed. The method comprises, in a call session control function (CSCF), receiving a session initiation protocol (SIP) registration message transferred by a user communication device and responsively transferring a registration request to a home subscriber server (HSS). The method further comprises, in the HSS, processing the registration request to obtain initial filter criteria (IFC) for the user communication device, wherein the IFC comprises processing instructions that direct the CSCF to perform an operation to dynamically obtain and load data into the IFC. The method further comprises, in the CSCF, receiving a SIP invite message transferred by the user communication device, and processing text from the SIP invite message against a set of keywords to determine a dynamic parameter based on a keyword match. The method further comprises, in the CSCF, processing one of the processing instructions in the IFC to obtain and load the dynamic parameter into the IFC, and processing the IFC with the dynamic parameter to determine a communication session parameter. The method further comprises, in the CSCF, transferring a SIP message with the communication session parameter responsive to the SIP invite message.

An IP multimedia subsystem comprises a CSCF and an HSS. The CSCF is configured to receive a SIP registration message transferred by a user communication device and responsively transfer a registration request to the HSS. The HSS is configured to process the registration request to obtain IFC for the user communication device, wherein the IFC comprises processing instructions that direct the CSCF to perform an operation to dynamically obtain and load data into the IFC. The CSCF is configured to receive a SIP invite message transferred by the user communication device, process text from the SIP invite message against a set of keywords to determine a dynamic parameter based on a keyword match, process one of the processing instructions in the IFC to obtain and load the dynamic parameter into the IFC, process the IFC with the dynamic parameter to determine a communication session parameter, and transfer a SIP message with the communication session parameter responsive to the SIP invite message.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
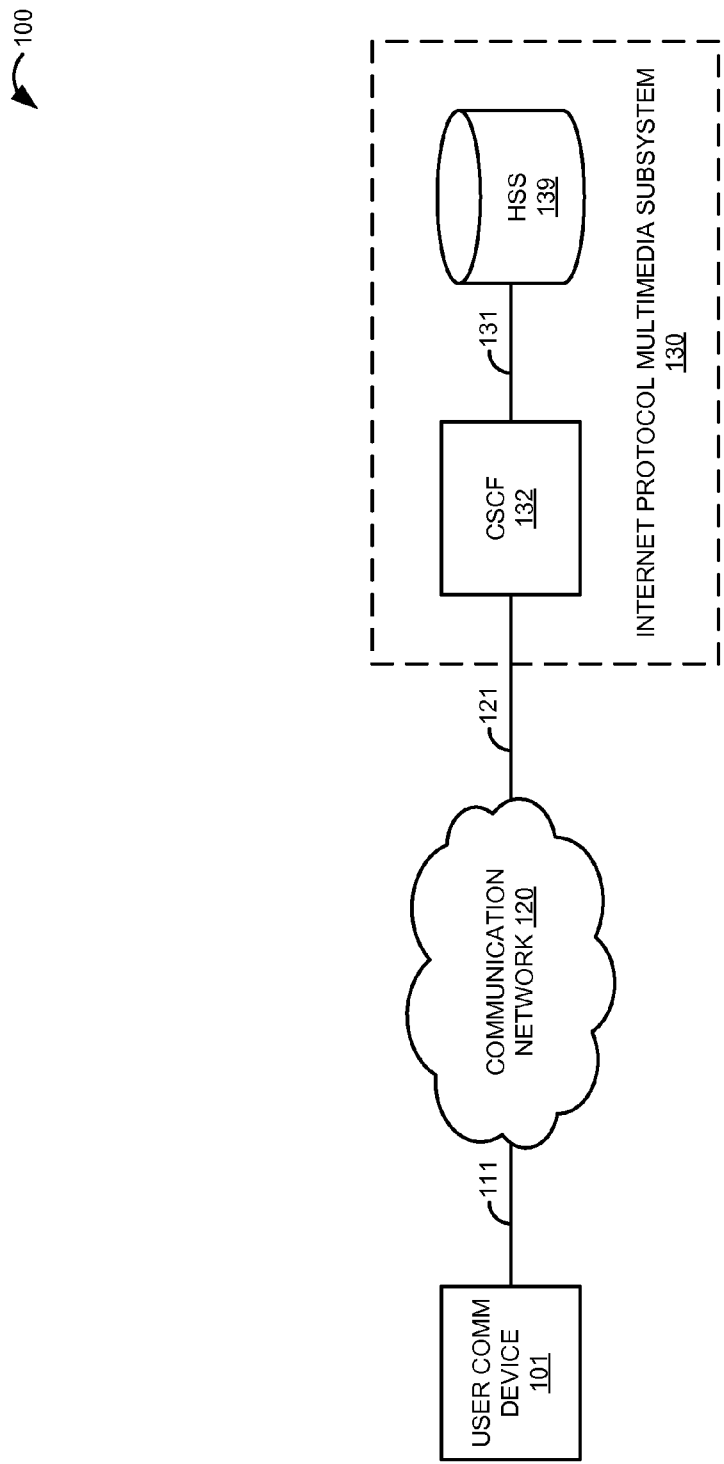
FIG. 1 is a block diagram that illustrates a communication system.

FIG. 1 is a block diagram that illustrates communication system 100.

Communication system 100 includes user communication device 101, communication network 120, and internet protocol (IP) multimedia subsystem (IMS) 130. IMS 130 comprises call session control function (CSCF) 132 and home subscriber server (HSS) 139. User communication device 101 and communication network 120 communicate over communication link 111. Communication network 120 and CSCF 132 communicate over communication link 121. CSCF 132 and HSS 139 are in communication over communication link 131.

Figure 2:
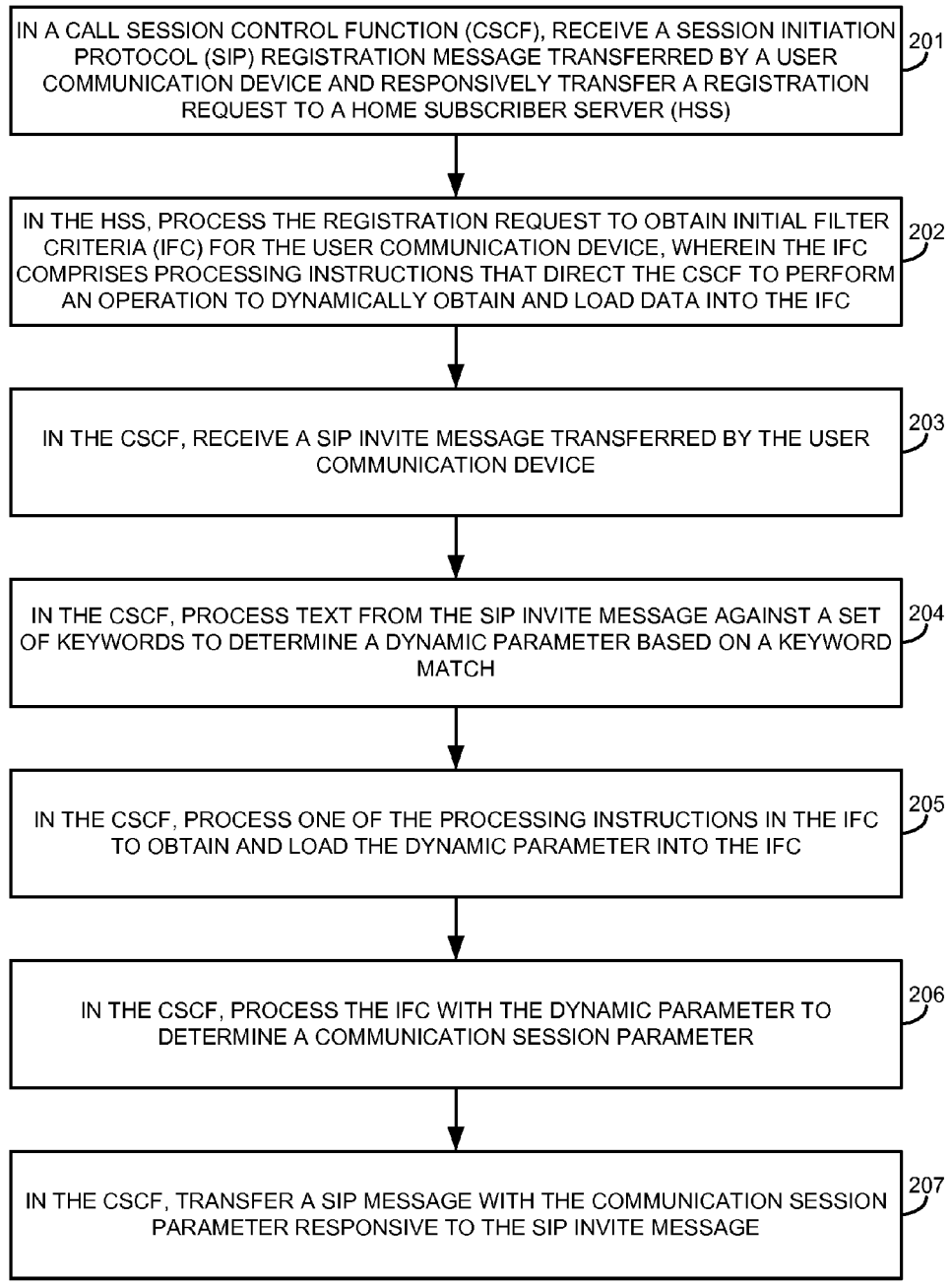
FIG. 2 is a flow diagram that illustrates an operation of the communication system.

FIG. 2 is a flow diagram that illustrates an operation of communication system 100. In particular, the operation of FIG. 2 shows a method of operating IMS 130 of communication system 100. The steps of the operation are indicated below parenthetically.

In FIG. 2, CSCF 132 receives a session initiation protocol (SIP) registration message transferred by user communication device 101 and responsively transfers a registration request to HSS 139 (201). The SIP registration message transferred by user communication device 101 typically includes information that is unique to device 101, such as an administrative domain, IP multimedia public identity (IMPU), IP multimedia private identity (IMPI), and other credentials for authenticating and registering device 101 into IMS 130. In some examples, CSCF 132 may bind the IP address of user communication device 101 to a SIP address of device 101 as part of the registration process. Typically, CSCF 132 responsively transfers the registration request to HSS 139 in the Diameter protocol.

HSS 139 processes the registration request to obtain initial filter criteria (IFC) for user communication device 101, wherein the IFC comprises processing instructions that direct CSCF 132 to perform an operation to dynamically obtain and load data into the IFC (202). The IFC is typically part of a service profile associated with user communication device 101 that is stored in HSS 139, and may be used by CSCF 132 to determine which services should be invoked for user communication device 101. Thus, the IFC often comprises user-specific service data and trigger points for CSCF 132 and define when an application server should be contacted by CSCF 132 to provide a communication service to user communication device 101. In this example, in addition to providing trigger points and identifying an associated application server, the IFC comprises processing instructions that direct CSCF 132 to perform an operation to dynamically obtain and load data into the IFC beyond what is stored in the service profile in HSS 139.

CSCF 132 receives a SIP invite message transferred by user communication device 101 (203). The SIP invite message is typically utilized by user communication device 101 and CSCF 132 to engage in a communication session with IMS 130 for the provision of IP multimedia services for device 101. In some examples, the SIP invite message transferred by user communication device 101 comprises a request to establish a communication session with an application server over IMS 130. Typically, the SIP invite message comprises a set of parameters and other information in the SIP packet body described in the session description protocol (SDP) and used by CSCF 132 to establish the communication session.

CSCF 132 processes text from the SIP invite message against a set of keywords to determine a dynamic parameter based on a keyword match (204). The set of keywords may be stored in CSCF 132 and could comprise a listing of various parameters and other information that may be found in the SIP invite message. In some examples, CSCF 132 processes the text from the SIP invite message using deep packet inspection to analyze parameters of the SIP invite message defined by the SDP. In some examples, CSCF 132 could process the text from the SIP invite message to determine codec information, bandwidth information, connection information (such as IPv4, IPv6, second generation (2G), third generation (3G), or fourth generation (4G) wireless connections, voice over internet protocol (VoIP), circuit-switched connections, and others), a device type of user communication device 101, a location of device 101, and any other dynamic parameters associated with user communication device 101, its connection attributes, and the requested media session.

CSCF 132 then processes one of the processing instructions in the IFC to obtain and load the dynamic parameter into the IFC (205). The processing instructions in the IFC could comprise any format, but are typically provided in the extensible markup language (XML) textual data format along with the other information in the IFC. In some examples, CSCF 132 processes one of the processing instructions in the IFC to obtain and load codec information, bandwidth information, connection information, a device type of user communication device 101, a location of device 101, or some other dynamic parameter into the IFC. For example, the processing instructions could indicate where CSCF 132 should insert the dynamic parameter into the IFC. In some examples, CSCF 132 processes one of the processing instructions in the IFC to obtain and load the dynamic parameter into the IFC so that a communication session parameter for the requested communication session is made conditional on the dynamic parameter.

After the dynamic parameter is loaded into the IFC, CSCF 132 processes the IFC with the dynamic parameter to determine a communication session parameter (206). Typically, XML information in the IFC is processed by CSCF 132 to determine the communication session parameter based on the dynamic parameter. For example, CSCF 132 could process a conditional statement with the dynamic parameter to determine the communication session parameter. The conditional statement could comprise a trigger point in the IFC that makes the communication session parameter conditional on the dynamic parameter. In some examples, CSCF 132 could process the IFC with the dynamic parameter to determine a media gateway and/or media gateway control function (MGCF) for user communication device 101, a codec for the communication session requested by device 101 in the SIP invite message, or some other communication session parameter that may be determined dynamically based on the dynamic parameter loaded into the IFC.

Once the communication session parameter is determined, CSCF 132 transfers a SIP message with the communication session parameter responsive to the SIP invite message (207). The SIP message is typically generated by CSCF 132 responsive to a logical condition of a trigger point being met in the IFC. In some examples, CSCF 132 transfers the SIP message with the communication session parameter for delivery to an application server identified in the IFC. Typically, the application server would be identified in the IFC by a uniform resource identifier (URI). A communication session between user communication device 101 and the application server is thus established, which utilizes the communication session parameter included in the SIP message.

Advantageously, the IFC retrieved from HSS 139 may be dynamically modified by CSCF 132 based on information in the SIP invite message received from user communication device 101. By determining a dynamic parameter in the SIP invite message based on a keyword match and loading the dynamic parameter into the IFC, CSCF 132 can determine a communication session parameter for a communication session requested by device 101 based on the dynamic parameter. In this manner, CSCF 132 associates content sensitivity with the IFC so that the dynamically determined communication session parameter can be enforced on a temporary basis for the duration of the communication session.

Referring back to FIG. 1, user communication device 101 comprises hardware and circuitry programmed to function as a telecommunications device. User communication device 101 may comprise a communication interface, user interface, memory device, software, processing circuitry, or some other communication components. For example, user communication device 101 could comprise a telephone, wireless transceiver, mobile phone, cellular phone, smartphone, computer, personal digital assistant (PDA), e-book, game console, mobile Internet device, network interface card, media player, or some communication apparatus—including combinations thereof. In some examples, user communication device 101 could comprise a wireless communication device comprising Radio Frequency (RF) communication circuitry and an antenna. The RF communication circuitry typically includes an amplifier, filter, modulator, and signal processing circuitry. Network protocols that may be utilized by user communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other network protocol that facilitates communication between user communication device 101 and communication network 120.

Communication network 120 comprises multiple network elements such as routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

CSCF 132 comprises a processing system and communication transceiver. CSCF 132 may also include other components such as a router, server, data storage system, and power supply. CSCF 132 may reside in a single device or may be distributed across multiple devices. CSCF 132 may be a discrete system or may be integrated within other systems—including other systems within communication system 100 and/or IMS 130. In some examples, CSCF 132 could comprise a serving-call session control function (S-CSCF), proxy-call session control function (P-CSCF), interrogating-call session control function (I-CSCF), SIP proxy system, network switch, mobile switching center, router, switching system, packet gateway, network gateway system, Internet access node, application server, service node, firewall, or some other communication system—including combinations thereof.

HSS 139 comprises a processing system and communication transceiver. HSS 139 may also include other components such as a router, server, data storage system, and power supply. HSS 139 may reside in a single device or may be distributed across multiple devices. HSS 139 may be a discrete system or may be integrated within other systems—including other systems within communication system 100 and/or IMS 130. In some examples, HSS 139 could comprise a user profile server function (UPSF), subscriber location function (SLF), home agent, home location register (HLR), authentication, authorization, and accounting (AAA) server, rules engine, authentication center (AuC), database system, network switch, router, switching system, packet gateway, network gateway system, Internet access node, application server, service node, firewall, or some other communication system—including combinations thereof.

Communication links 111, 121, and 131 use metal, air, space, optical fiber such as glass or plastic, or some other material as the transport media—including combinations thereof. Communication links 111, 121, and 131 could use various communication protocols, such as TDM, IP, Ethernet, telephony, optical networking, hybrid fiber coax (HFC), communication signaling, wireless protocols, or some other communication format—including combinations thereof. Communication links 111, 121, and 131 may be direct links or could include intermediate networks, systems, or devices.

Figure 3:
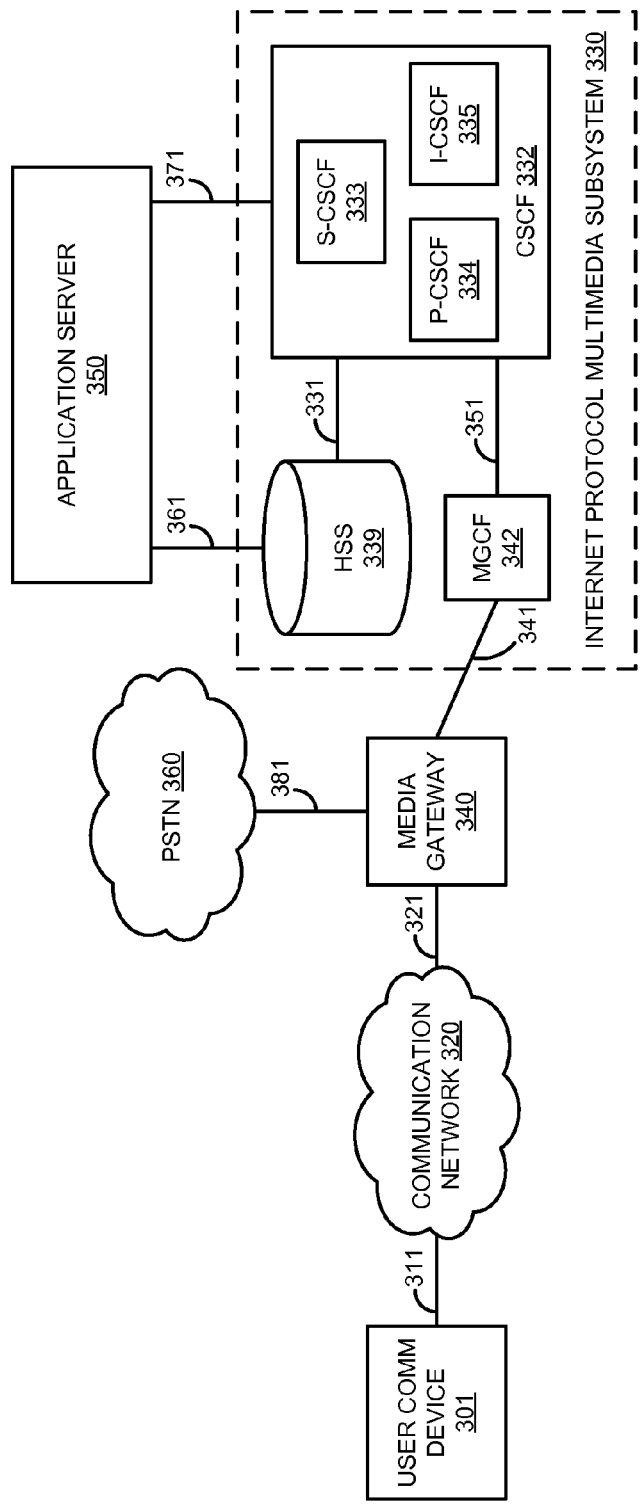
FIG. 3 is a block diagram that illustrates a communication system in an exemplary embodiment.

FIG. 3 is a block diagram that illustrates communication system 300.

Communication system 300 includes user communication device 301, communication network 320, IMS 330, media gateway 340, application server 350, and PSTN 360. IMS 330 comprises call session control function (CSCF) 332, home subscriber server (HSS) 339, and media gateway control function (MGCF) 342. CSCF 332 comprises serving-CSCF (S-CSCF) 333, proxy-CSCF (P-CSCF) 334, and interrogating-CSCF (I-CSCF) 335. User communication device 301 and communication network 320 communicate over communication link 311. Communication network 320 and media gateway 340 are in communication over communication link 321. Media gateway 340 and MGCF 342 communicate over communication link 341. MGCF 342 and CSCF 332 are in communication over communication link 351. CSCF 332 and HSS 339 communicate over communication link 331. HSS 339 and application server 350 are in communication over communication link 361, while CSCF 332 and application server 350 communicate over communication link 371. Media gateway 340 and PSTN 360 are in communication over communication link 381.

Figure 4:
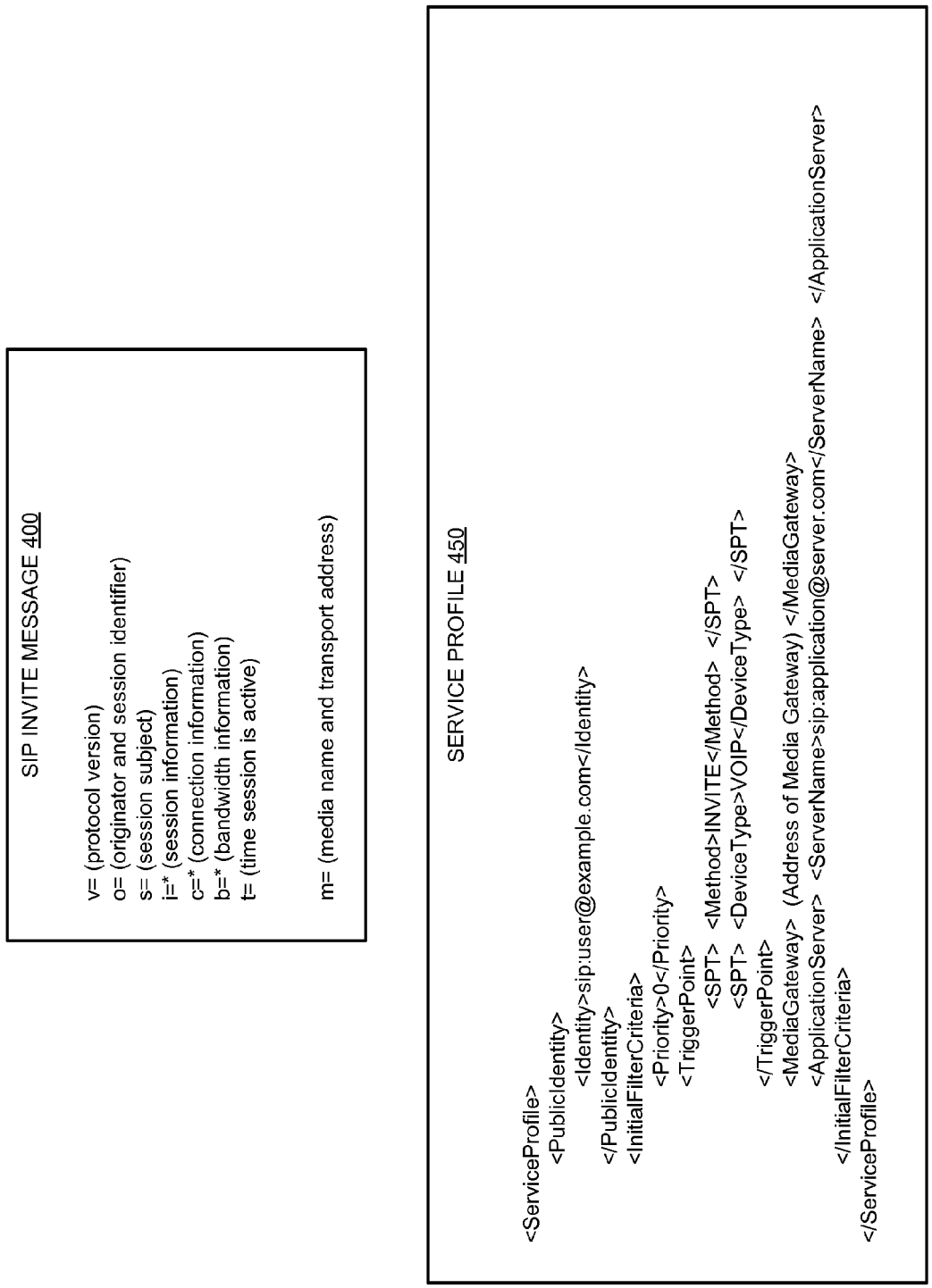
FIG. 4 is a block diagram that illustrates a SIP invite message and a service profile in an exemplary embodiment.

FIG. 4 is a block diagram that illustrates SIP invite message 400 and service profile 450 in an exemplary embodiment. SIP invite message 400 provides an example of a SIP invite message that may be transferred to S-CSCF 333 by user communication device 301. In particular, SIP invite message 400 comprises session attributes and capabilities described in SDP that are contained within the SIP packet body. Note that the parenthetical descriptions shown in SIP invite message 400 are merely indicative of the type of information that may be provided in the SDP description, and that actual values would be included in a typical SIP invite message. In SIP invite message 400, mandatory attributes are designated with an equals sign, and optional values are specified by an equals sign followed by an asterisk. The information types shown in SIP invite message 400 include, in the session level section, a protocol version, originator and session identifier, session subject, session information, connection information, bandwidth information, and time the session is active. In the media level section, the media name and transport address is provided, which could include an indication of whether the requested media session comprises audio, video, or text, along with a port number, media format description, codec, and other media description information. Of course, greater or fewer attributes could be included in other examples.

Service profile 450 provides an example of a service profile for user communication device 301. Service profile 450 includes a URI description of a public identity for user communication device 301, along with IFC for an application server to which user communication device 301 has subscribed.

In this example, S-CSCF 333 has received a service profile for user communication device 301 from HSS 339 and subsequently modified the IFC to generate service profile 450. In particular, S-CSCF 333 has inserted the <DeviceType> and <MediaGateway> attributes into the service profile received from HSS 339 to create the service profile 450 as shown in FIG. 4. Thus, the unmodified service profile for user communication device 301 as stored in HSS 339 includes IFC with a trigger point containing only the <Method>INVITE</Method> service point trigger (SPT) attribute, and the URI of the application server. Therefore, the trigger point in the unmodified service profile as stored in HSS 339 would simply direct S-CSCF 333 to contact the specified application server URI in the event of receiving a SIP invite message from user communication device 301.

However, the IFC in the modified service profile 450 includes a trigger point that contains two instances of SPT attributes: an INVITE method and a VoIP device type. The IFC then specifies a media gateway and the application server URI in the event that the trigger point conditions are satisfied. In this example, S-CSCF 333 has analyzed the SDP information in the SIP invite message 400 to determine that the device type of user communication device 301 is VoIP and that the call is destined for the PSTN 360. Thus, S-CSCF 333 has added the <DeviceType> SPT to the IFC to specify the VoIP device type. In addition, MGCF 342 has selected media gateway 340 as an egress route for the call to the PSTN 360, so S-CSCF 333 has inserted the address of media gateway 340 into the IFC as shown in service profile 450. Therefore, the modified IFC in service profile 450 specifies that if the method equals INVITE and the device type is VoIP then S-CSCF 333 will contact the application server by transferring a SIP message to the application server URI and will include the specified media gateway in the message. The particular techniques employed by S-CSCF 333 to modify the IFC of the service profile stored in HSS 339 to generate service profile 450 and the subsequent processing of the modified IFC by S-CSCF 333 in order to establish the VoIP call will now be discussed with respect to the sequence diagram of FIG. 5.

Figure 5:
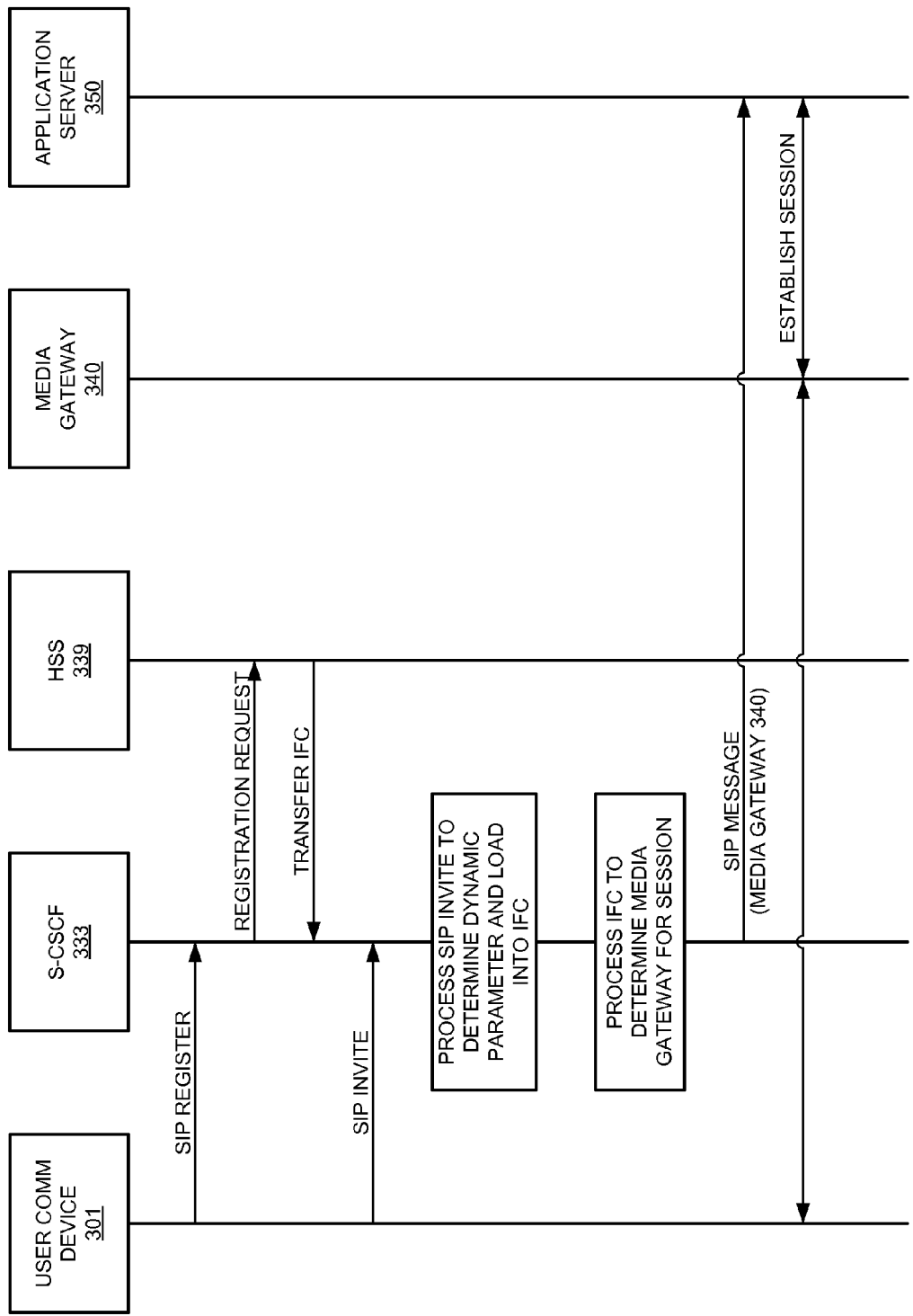
FIG. 5 is a sequence diagram that illustrates an operation of the communication system in an exemplary embodiment.

FIG. 5 is a sequence diagram that illustrates an operation of communication system 300 in an exemplary embodiment. In FIG. 5, user communication device 301 transfers a SIP REGISTER message for delivery to S-CSCF 333 in IMS 330 in order to register with IMS 330. The SIP REGISTER message includes identifiers, credentials, secret keys, and other information necessary to authenticate and authorize user communication device 301 to access the IMS 330 domain. During the registration process, I-CSCF 335 will first contact HSS 339 in the Diameter protocol to verify that user communication device 301 is authorized to register in the IMS 330 domain, and will receive information from HSS 339 required for the selection of S-CSCF 333 which is allocated to user communication device 301.

S-CSCF 333 then acts as a SIP registrar for the IMS 330 domain to which the user communication device 301 belongs. S-CSCF 333 therefore transfers a registration request in the Diameter protocol to HSS 339 to retrieve authentication data and a service profile for user communication device 301 from HSS 339. Included in the service profile is user-specific service data in the form of IFC, which includes trigger points for S-CSCF 333 that indicate when S-CSCF 333 should contact an application server 350 on behalf of user communication device 301.

In this example, user communication device 301 comprises a VoIP communication device type that is attempting to place a call to a traditional telephone connected to a circuit-switched network of the PSTN 360. In order to place the call to the PSTN telephone, user communication device 301 transfers a SIP INVITE message for delivery to S-CSCF 333 to establish a connection to application server 350, which will provide the VoIP service for the call in this example. The SIP INVITE message includes information for S-CSCF 333 in an SDP description contained in the SIP packet body, an example of which is provided in SIP invite message 400 shown in FIG. 4. S-CSCF 333 processes the SIP INVITE message to determine a dynamic parameter and loads the dynamic parameter into the IFC of the service profile received from HSS 339. In this example, S-CSCF 333 determines from the SDP information in the SIP INVITE message that user communication device has a device type of VoIP, and that the destination of the call is to a device connected to the PSTN 360. The dynamic parameter in this example is therefore the VoIP device type of user communication device 301. S-CSCF 333 could then transfer a SIP message to MGCF 342 and provide this dynamic information so that MGCF 342 can select a media gateway 340 for an egress route for the call to the PSTN 360. S-CSCF 333 then loads the dynamic parameter into the IFC to generate service profile 450, as shown in FIG. 4. In particular, S-CSCF 333 inserts the <DeviceType> service point trigger (SPT) into the trigger point for application server 350, which results in the trigger point for application server 350 being conditional on both the SIP INVITE message and the VoIP device type. In addition, S-CSCF 333 modifies the IFC to include the address of media gateway 340 selected by MGCF 342 as an egress route to PSTN 360, as shown in service profile 450.

S-CSCF 333 then processes the modified IFC in service profile 450 with the VoIP device type dynamic parameter to determine a communication session parameter for the call, which is media gateway 340 in this example. Since both the SPT values in the trigger point of service profile 450 are satisfied, S-CSCF 333 transfers a SIP message to the application server 350 indicated in the IFC for that trigger point. S-CSCF 333 includes the address of media gateway 340 in the SIP message transferred to application server 350 and indicates that gateway 340 should be used as an egress route to the PSTN 360 for the call. Application server 350 then establishes the VoIP call from user communication device 301 to a destination terminal connected to PSTN 360 via media gateway 340 as instructed in the SIP message.

The above example illustrates how S-CSCF 333 can effectively modify the IFC received in the service profile from HSS 339 based on a dynamic parameter provided in the SDP of the SIP INVITE message received from user communication device 301. Without such dynamic modification of the IFC, the same IFC in the service profile for the user of device 301 would apply, regardless of the device type of user communication device 301. By dynamically modifying the IFC based on information in the SIP INVITE message transferred by user communication device 301 when establishing a communication session, S-CSCF 333 may determine more intelligent routing decisions, codec selections, and other communication session parameters. Some additional examples of such determinations include selecting a closest media gateway 340 based on a location of user communication device 301, selecting a gateway or codec based on the bandwidth for the communication session indicated in the SDP, selecting a gateway based on codec information included in the SDP, or any other communication session parameters that may be determined based on dynamic parameters included in the SIP INVITE message.

Figure 6:
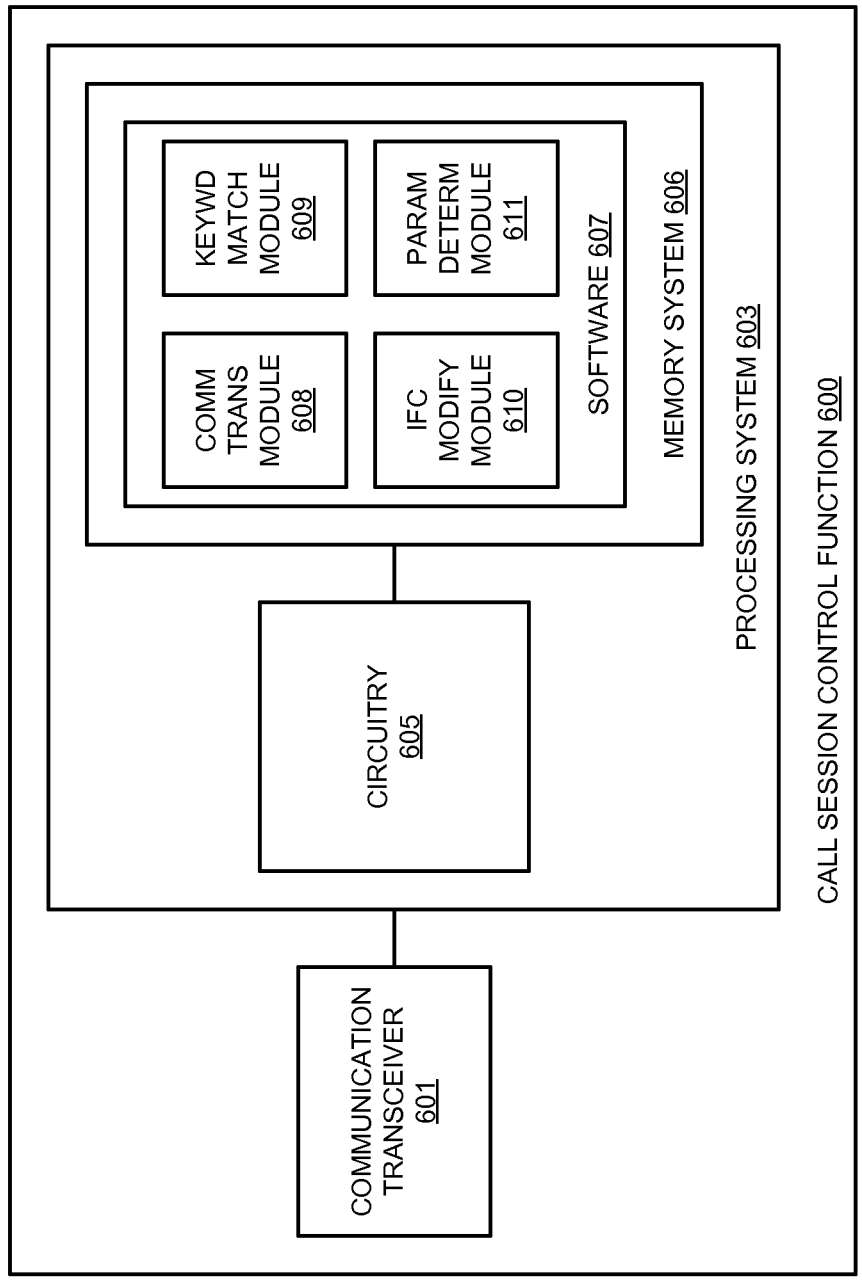
FIG. 6 is a block diagram that illustrates a call session control function.

FIG. 6 is a block diagram that illustrates call session control function (CSCF) 600. CSCF 600 provides an example of CSCF 132, although CSCF 132 may use alternative configurations. CSCF 600 comprises communication transceiver 601 and processing system 603. Processing system 603 is linked to communication transceiver 601. Processing system 603 includes processing circuitry 605 and memory system 606 that stores operating software 607. Operating software 607 comprises software modules 608-611.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. Communication transceiver 601 is configured to receive a session initiation protocol (SIP) registration message transferred by a user communication device and responsively transfer a registration request to a home subscriber server (HSS). Communication transceiver 601 may also be configured to receive initial filter criteria (IFC) for the user communication device from the HSS, wherein the IFC comprises processing instructions that direct the CSCF to perform an operation to dynamically obtain and load data into the IFC. Further, communication transceiver 601 is configured to receive a SIP invite message transferred by a user communication device, and transfer a SIP message with a communication session parameter responsive to the SIP invite message.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-611, although software 607 could have alternative configurations in other examples.

When executed by circuitry 605, operating software 607 directs processing system 603 to operate as described herein for CSCF 132. In particular, operating software 607 may direct processing system 603 to direct communication transceiver 601 to receive a session initiation protocol (SIP) registration message transferred by a user communication device and responsively transfer a registration request to a home subscriber server (HSS), and to receive initial filter criteria (IFC) for the user communication device from the HSS, wherein the IFC comprises processing instructions that direct the CSCF to perform an operation to dynamically obtain and load data into the IFC. Further, operating software 607 directs processing system 603 to receive a SIP invite message transferred by the user communication device, process text from the SIP invite message against a set of keywords to determine a dynamic parameter based on a keyword match, process one of the processing instructions in the IFC to obtain and load the dynamic parameter into the IFC, process the IFC with the dynamic parameter to determine a communication session parameter, and transfer a SIP message with the communication session parameter responsive to the SIP invite message.

In this example, operating software 607 comprises a communication transceiver software module 608 that receives a session initiation protocol (SIP) registration message transferred by a user communication device and responsively transfers a registration request to a home subscriber server (HSS), receives initial filter criteria (IFC) for the user communication device from the HSS, wherein the IFC comprises processing instructions that direct the CSCF to perform an operation to dynamically obtain and load data into the IFC, receives a SIP invite message transferred by the user communication device, and transfers a SIP message with a communication session parameter responsive to the SIP invite message. Additionally, operating software 607 comprises a keyword matching software module 609 that processes text from the SIP invite message against a set of keywords to determine a dynamic parameter based on a keyword match. Further, operating software 607 also comprises an IFC modification software module 610 that processes one of the processing instructions in the IFC to obtain and load the dynamic parameter into the IFC. Finally, operating software 607 comprises a parameter determination software module 611 that processes the IFC with the dynamic parameter to determine a communication session parameter.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an internet protocol (IP) multimedia subsystem, the method comprising:
    in a call session control function (CSCF), receiving a session initiation protocol (SIP) registration message transferred by a user communication device and responsively transferring a registration request to a home subscriber server (HSS);
    in the HSS, processing the registration request to obtain initial filter criteria (IFC) for the user communication device, wherein the IFC comprises processing instructions indicated using a markup language that direct the CSCF to perform an operation to dynamically obtain and load data into the IFC;
    in the CSCF, receiving a SIP invite message transferred by the user communication device;
    in the CSCF, processing text from the SIP invite message against a set of keywords to determine a dynamic parameter based on a keyword match;
    in the CSCF, processing one of the processing instructions in the IFC to obtain and load the dynamic parameter into the IFC;
    in the CSCF, processing the IFC with the dynamic parameter to determine a communication session parameter; and
    in the CSCF, transferring a SIP message with the communication session parameter responsive to the SIP invite message.

2. The method of claim 1 wherein processing the text from the SIP invite message against the set of keywords to determine the dynamic parameter based on the keyword match comprises processing the text from the SIP invite message using deep packet inspection.

3. The method of claim 1 wherein processing the text from the SIP invite message to determine the dynamic parameter comprises processing the text from the SIP invite message to determine codec information, and wherein processing one of the processing instructions in the IFC to obtain and load the dynamic parameter into the IFC comprises processing one of the processing instructions in the IFC to obtain and load the codec information into the IFC.

4. The method of claim 1 wherein processing the text from the SIP invite message to determine the dynamic parameter comprises processing the text from the SIP invite message to determine bandwidth information, and wherein processing one of the processing instructions in the IFC to obtain and load the dynamic parameter into the IFC comprises processing one of the processing instructions in the IFC to obtain and load the bandwidth information into the IFC.

5. The method of claim 1 wherein processing the text from the SIP invite message to determine the dynamic parameter comprises processing the text from the SIP invite message to determine a device type of the user communication device, and wherein processing one of the processing instructions in the IFC to obtain and load the dynamic parameter into the IFC comprises processing one of the processing instructions in the IFC to obtain and load the device type into the IFC.

6. The method of claim 1 wherein processing the IFC with the dynamic parameter to determine the communication session parameter comprises processing a conditional statement with the dynamic parameter to determine the communication session parameter.

7. The method of claim 1 wherein processing the IFC with the dynamic parameter to determine the communication session parameter comprises processing the IFC with the dynamic parameter to determine a media gateway.

8. The method of claim 1 wherein processing the IFC with the dynamic parameter to determine the communication session parameter comprises processing the IFC with the dynamic parameter to determine a codec.

9. The method of claim 1 wherein transferring the SIP message with the communication session parameter responsive to the SIP invite message comprises transferring the SIP message with the communication session parameter responsive to the SIP invite message for delivery to an application server identified in the IFC.

10. The method of claim 2 wherein processing the text from the SIP invite message using deep packet inspection comprises analyzing parameters of the SIP invite message defined by a session description protocol.

11. An internet protocol (IP) multimedia subsystem comprising:
a call session control function (CSCF) configured to receive a session initiation protocol (SIP) registration message transferred by a user communication device and responsively transfer a registration request to a home subscriber server (HSS);
the HSS configured to process the registration request to obtain initial filter criteria (IFC) for the user communication device, wherein the IFC comprises processing instructions indicated using a markup language that direct the CSCF to perform an operation to dynamically obtain and load data into the IFC; and
the CSCF configured to receive a SIP invite message transferred by the user communication device, process text from the SIP invite message against a set of keywords to determine a dynamic parameter based on a keyword match, process one of the processing instructions in the IFC to obtain and load the dynamic parameter into the IFC, process the IFC with the dynamic parameter to determine a communication session parameter, and transfer a SIP message with the communication session parameter responsive to the SIP invite message.

12. The IP multimedia subsystem of claim 11 wherein the CSCF configured to process the text from the SIP invite message against the set of keywords to determine the dynamic parameter based on the keyword match comprises the CSCF configured to process the text from the SIP invite message using deep packet inspection.

13. The IP multimedia subsystem of claim 11 wherein the CSCF configured to process the text from the SIP invite message to determine the dynamic parameter comprises the CSCF configured to process the text from the SIP invite message to determine codec information, and wherein the CSCF configured to process one of the processing instructions in the IFC to obtain and load the dynamic parameter into the IFC comprises the CSCF configured to process one of the processing instructions in the IFC to obtain and load the codec information into the IFC.

14. The IP multimedia subsystem of claim 11 wherein the CSCF configured to process the text from the SIP invite message to determine the dynamic parameter comprises the CSCF configured to process the text from the SIP invite message to determine bandwidth information, and wherein the CSCF configured to process one of the processing instructions in the IFC to obtain and load the dynamic parameter into the IFC comprises the CSCF configured to process one of the processing instructions in the IFC to obtain and load the bandwidth information into the IFC.

15. The IP multimedia subsystem of claim 11 wherein the CSCF configured to process the text from the SIP invite message to determine the dynamic parameter comprises the CSCF configured to process the text from the SIP invite message to determine a device type of the user communication device, and wherein the CSCF configured to process one of the processing instructions in the IFC to obtain and load the dynamic parameter into the IFC comprises the CSCF configured to process one of the processing instructions in the IFC to obtain and load the device type into the IFC.

16. The IP multimedia subsystem of claim 11 wherein the CSCF configured to process the IFC with the dynamic parameter to determine the communication session parameter comprises the CSCF configured to process a conditional statement with the dynamic parameter to determine the communication session parameter.

17. The IP multimedia subsystem of claim 11 wherein the CSCF configured to process the IFC with the dynamic parameter to determine the communication session parameter comprises the CSCF configured to process the IFC with the dynamic parameter to determine a media gateway.

18. The IP multimedia subsystem of claim 11 wherein the CSCF configured to process the IFC with the dynamic parameter to determine the communication session parameter comprises the CSCF configured to process the IFC with the dynamic parameter to determine a codec.

19. A method of operating an internet protocol (IP) multimedia subsystem, the method comprising:
in a call session control function (CSCF), receiving a session initiation protocol (SIP) registration message transferred by a user communication device and responsively transferring a registration request to a home subscriber server (HSS);
in the HSS, processing the registration request to obtain initial filter criteria (IFC) for the user communication device, wherein the IFC comprises processing instructions indicated using a markup language that direct the CSCF to perform an operation to dynamically obtain and load data into the IFC;
in the CSCF, receiving a SIP invite message transferred by the user communication device, wherein the SIP invite message comprises a request to establish a communication session with an application server;

in the CSCF, processing text from the SIP invite message against a set of keywords to determine connection information for the communication session based on a keyword match;

in the CSCF, processing one of the processing instructions in the IFC to obtain and load the connection information into the IFC;

in the CSCF, processing the IFC with the connection information to determine a codec for the communication session; and in the CSCF, transferring a SIP message with the codec responsive to the SIP invite message for delivery to the application server identified in the IFC.

20. The IP multimedia subsystem of claim 12 wherein the CSCF configured to process the text from the SIP invite message using deep packet inspection comprises the CSCF configured to analyze parameters of the SIP invite message defined by a session description protocol.

* * * * *